US009038794B2

(12) United States Patent
Cornic (10) Patent No.: US 9,038,794 B2
(45) Date of Patent: May 26, 2015

(54) METHOD FOR OPTIMIZING THE OPERATION OF A REVERSIBLE TRACTION SUBSTATION AND ASSOCIATED DEVICES (71) Applicant: ALSTOM TRANSPORT SA, Levallois-Perret (FR)

(72) Inventor: Daniel Cornic, Fourqueux (FR)

(73) Assignee: ALSTOM TRANSPORT TECHNOLOGIES, Levallois-Perret (FR)

(*) Notice: Subject to any disclaimer, the term of this patent is extended or adjusted under 35 U.S.C. 154(b) by 0 days.

(21) Appl. No.: 14/140,664

(22) Filed: Dec. 26, 2013

(65) Prior Publication Data
US 2014/0182991 A1 Jul. 3, 2014

(30) Foreign Application Priority Data

Dec. 27, 2012 (FR) ...................................... 12 62886

(51) Int. Cl.
*B60L 1/00* (2006.01)
*B60L 9/00* (2006.01)
*B60M 3/06* (2006.01)
*B60L 11/18* (2006.01)

(52) U.S. Cl.
CPC .. *B60L 9/00* (2013.01); *B60M 3/06* (2013.01); *B60L 11/1801* (2013.01); *B60L 2200/26* (2013.01)

(58) Field of Classification Search
USPC .................. 191/2–9, 14, 17, 20; 301/9.1, 116
See application file for complete search history.

(56) References Cited

U.S. PATENT DOCUMENTS

| 4,467,314 | A | * | 8/1984 | Weikel et al. ................. 700/295 |
| 5,280,418 | A | * | 1/1994 | Griffin ............................. 363/34 |
| 5,346,163 | A | * | 9/1994 | Momma et al. .................... 246/5 |
| 5,351,775 | A | * | 10/1994 | Johnston et al. ........... 180/65.31 |
| 6,230,861 | B1 | * | 5/2001 | Cornic ......................... 191/45 R |
| 6,382,378 | B1 | * | 5/2002 | Cornic ............................. 191/6 |
| 7,397,149 | B2 | * | 7/2008 | Seddiki et al. .................. 307/62 |

(Continued)

FOREIGN PATENT DOCUMENTS

| CN | 101376344 A | 3/2009 |
| EP | 1985490 A1 | 10/2008 |

(Continued)

OTHER PUBLICATIONS

Preliminary Search Report in related French patent application FR 12628886.

*Primary Examiner* — Jason C Smith
(74) *Attorney, Agent, or Firm* — Eric L. Lane; Green Patent Law (57) ABSTRACT

The method according to the invention aims to optimize the operation of a reversible traction substation (Sk) of a power supply system (4) for railway vehicles, said reversible substation being able to be commanded in a traction operating mode or a braking mode.

This method includes:
determining a current value (Mc) of a favored operating mode;
maximizing at least one optimization function (F) that depends on the current value of the favored operating mode, based on instantaneous values (G(t)) of multiple operating properties of the substation (Sk);
computing optimized values (Popt(t)) for multiple configuration parameters of the substation (Sk) from maximized values (Gmax(t)) of the operating properties.

9 Claims, 4 Drawing Sheets

(56) References Cited

U.S. PATENT DOCUMENTS

| | | | |
|---|---|---|---|
| 7,689,332 B2 * | 3/2010 | Yakes et al. | 701/22 |
| 8,333,349 B2 * | 12/2012 | Altamura et al. | 246/4 |
| 8,590,682 B2 * | 11/2013 | Meins et al. | 191/10 |
| 8,729,728 B2 * | 5/2014 | Bavard et al. | 307/10.1 |
| 2002/0029097 A1 * | 3/2002 | Pionzio et al. | 700/286 |
| 2002/0174798 A1 * | 11/2002 | Kumar | 105/50 |
| 2003/0158631 A1 * | 8/2003 | Masuda et al. | 700/286 |
| 2003/0230994 A1 * | 12/2003 | Seddiki et al. | 318/432 |
| 2014/0182991 A1 * | 7/2014 | Cornic | 191/4 |

FOREIGN PATENT DOCUMENTS

| | | |
|---|---|---|
| JP | 7-304353 A | 11/1995 |
| JP | 2008-74183 A | 4/2008 |
| JP | 2009-67205 A | 4/2009 |
| WO | WO 2009/153416 A1 | 12/2009 |
| WO | WO 2012/111607 A1 | 8/2012 |

* cited by examiner

METHOD FOR OPTIMIZING THE OPERATION OF A REVERSIBLE TRACTION SUBSTATION AND ASSOCIATED DEVICES

The invention relates to a method for optimizing the operation of a reversible traction substation of a power supply system for railway vehicles, the system being situated at the interface between a power supply grid and a DC power line, positioned along a track and to which a railway vehicle can be electrically connected, the reversible substation being, inter alia, able to be commanded in the traction operating mode to transfer electricity delivered by the grid to the line, and in braking mode to transfer excess recovery electricity captured on the line to the grid.

Document EP 1,985,492 A1 describes such a system for supplying power to railway vehicles from reversible traction substations.

Each reversible substation of the system includes a converter that can be activated to operate:

either as a rectifier, so as to convey electricity from the grid toward the line to supply electricity to a vehicle, situated near the substation, the engines of which are in traction operation;

or as an inverter, so as to convey electricity from the line to the grid to recover electricity from a vehicle, situated near the substation, the engines of which are in braking operation.

When the converter is operating as a rectifier, the substation is said to be in the traction operating mode, and when the converter operates as an inverter, the substation is said to be in the braking operation mode. Lastly, when the converter is inactive, the substation is said to be in standby operating mode.

In any of the aforementioned operating modes of the substation, the operating point of the converter depends on multiple configuration parameters, the values of which are set upon deployment of the system. In particular, the substation is configured so as, in traction operation, to use a traction current/voltage characteristic, and in braking operation, a braking current/voltage characteristic. These traction and braking characteristics are fixed.

However, in traction mode, the voltage applied by the converter to the line $U_{ssk}$ should be maximized so as, at a constant power, to reduce the current injected on the line by the converter and thereby reduce the losses by Joule effect along the line as far as the vehicle to be powered.

In braking mode, on the contrary, the voltage applied by the converter to the line $U_{ssk}$ should be minimized in order to increase the distance over which the braking energy can be recovered by a substation.

Thus, the energy efficiency of a substation of the prior art is defined during the design phase of the system and set upon deployment of the system.

The invention therefore aims to offset the aforementioned problem, in particular by proposing a method allowing automatic and dynamic optimization of the operating point of the converter of a reversible traction substation, based on the values of the operating parameters of the various substations of the system during its use.

To that end, the invention relates to an optimization method of the aforementioned type, including:

determining a current value of a favored operating mode from instantaneous values of multiple operating parameters of the substation;

maximizing at least one optimization function that depends on the current value of the a favored operating mode, based on instantaneous values of multiple operating properties of the substation, so as to obtain maximized values of the operating properties;

computing optimized values for multiple configuration parameters of the substation from maximized values of the operating properties, said optimized values of said configuration parameters being saved as current values of the configuration parameters to control the substation.

According to specific embodiments, the method includes one or more of the following features, considered alone or according to all technically possible combinations:

the favored operating mode assumes a current value in the set including the value +1 when the favored mode corresponds to the traction operating mode, the value −1 when the favored mode corresponds to the braking operating mode, optionally the value 0 when no operating mode is to be favored among the traction operating mode and the braking operating mode, and optionally the value −2 when the favored mode is a standby mode, in which mode no energy is exchanged between the grid and the line, the substation then being controlled to minimize its electricity consumption;

the determination of the current value of an operating mode comprises a decision step that implements an algorithm of the decision tree type to determine an instantaneous value from the instantaneous values of the multiple operating parameters of the substation and update the current value with the instantaneous value;

said algorithm of the decision tree type uses, as input, the instantaneous values of the operating parameters from among an operating interval of the railway vehicles on said track, an AC voltage delivered by the grid, and, when the system includes at least two reversible substations, the distance between said at least two substations;

the method includes a step for selecting the optimization function to be maximized, based on the current value of the favored operating mode;

the optimization function is a weighted sum of multiple elementary functions;

the selection step uses an algorithm for estimating weights used to weight each elementary function in the optimization function;

the selection step uses an adaptation algorithm serving to cause the elementary functions included in the definition of the optimization function to evolve over the course of the use of said substation; and the maximization includes determining the instantaneous value of the selected optimization function as a function of the values of the operating properties, the modification of the instantaneous values of the operating properties, the determination of the modified value of the optimization function as a function of the modified values of the operating properties, the comparison of the modified value and the instantaneous value of the constraint function, and, when the modified value is greater than the instantaneous value, allocating the modified values as maximized values of the operating properties.

The invention also relates to an information recording medium, including instructions for executing an optimization method as defined above, when the instructions are executed by an electronic computer.

The invention also relates to a reversible traction substation for a power supply system for railway vehicles, the system being situated at the interface between an AC supply grid and a DC supply line arranged along a track and to which a railway vehicle can be electrically connected, the reversible substation being, inter alia, controllable in braking operation to transfer electricity captured on the line to the grid, and in traction operation to transfer electricity delivered by the grid to the line, the substation including a converter and a computer controlling the converter, the computer being programmed to carry out an optimization method as defined above.

The invention lastly relates to a power supply system for railway vehicles, the system being situated at the interface between an AC supply grid and a DC supply line, positioned along a track and to which a railway vehicle can be electrically connected, the system including at least one reversible traction substation controlled, inter alia, in braking operation to transfer electricity captured on the line to the grid, and in traction operation to transfer electricity delivered by the grid to the line, said substation being as defined above.

Figure 1:
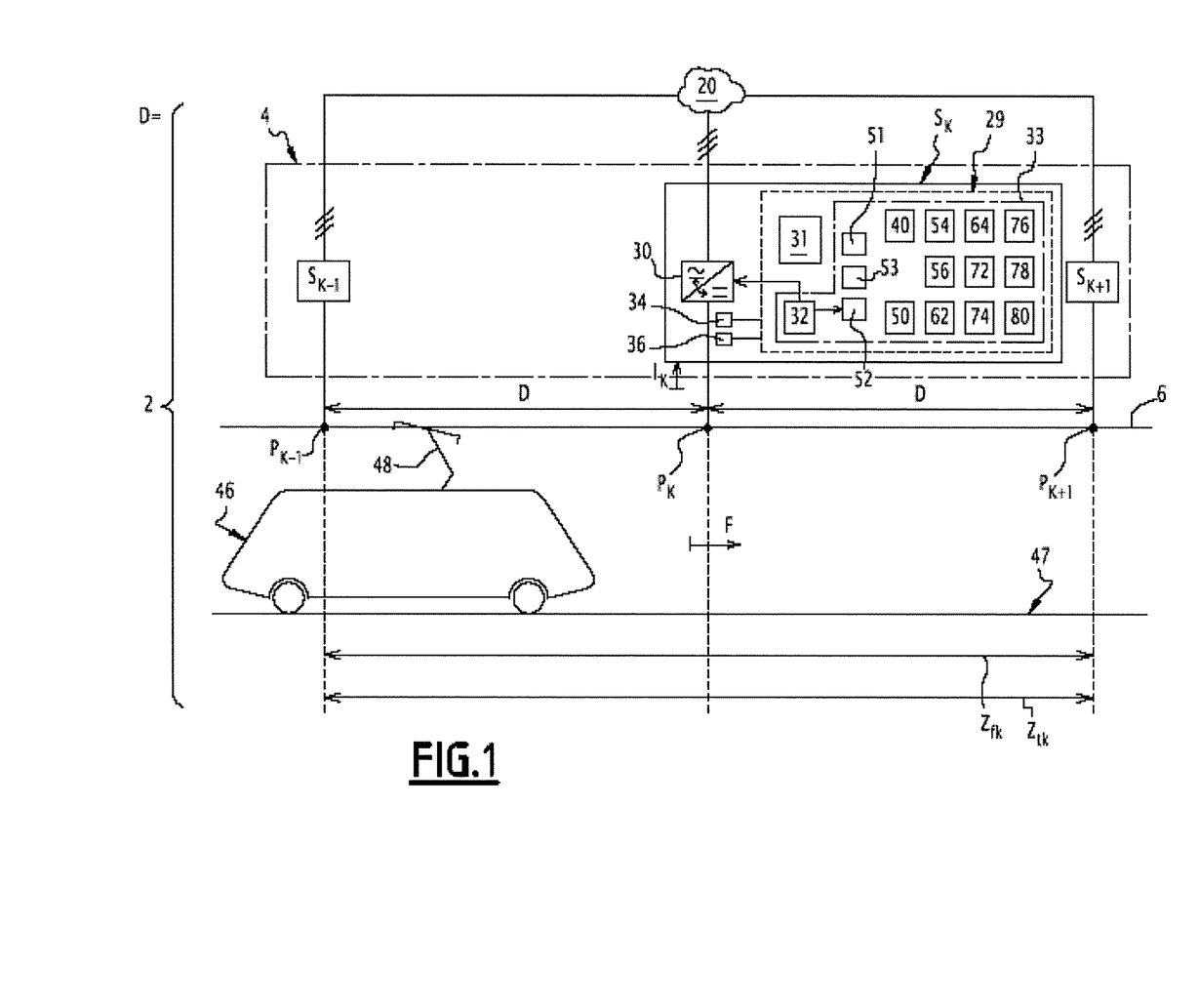
FIG. 1 is a diagrammatic illustration of a railway vehicle equipped with a power supply system including multiple reversible substations, on which railway grid at least one railway vehicle can travel.

The invention and its advantages will be better understood upon reading the following description, provided solely as an example and done in reference to the appended drawings, in which:

FIG. 1 shows a railway grid 2 equipped with a power supply system 4.

The system 4 is situated at the interface between a current supply grid 20 and a power supply line 6 that is arranged along a track 47 for the travel of railway vehicles, such as the vehicle 46. The latter is electrically connected to the line 6 by a traditional pantograph 48.

The grid 20 is a grid capable of delivering an AC voltage Vn that is a three-phase AC high voltage. An alternating high voltage here refers to an AC voltage comprised between 1000 and 50,000 V AC. According to the teaching of patent application FR 28 73 332, this grid 20 can also be a three-phase alternating low-voltage grid. Here, three-phase alternating low voltage refers to a voltage below 1000 V AC. Typically, this three-phase alternating low-voltage grid will then be a low-voltage grid whereof the AC voltage is comprised between 400 and 1000 V AC.

The rated voltage on the line 6 is a DC voltage whereof the rated value Uc_nom is 750, 1500, or 3000 V DC and whereof the variations around Uc_nom are comprised between Uc_min and Uc_max, as specified in European standard EN 50163.

The system 4 includes multiple reversible traction substations, identical to each other, distributed at regular intervals along the line 6. To simplify FIG. 1, only three substations $S_{k-1}$, $S_k$ and $S_{k+1}$ have been shown.

The index k represents the order number of each substation starting from a substation $S_0$ situated at one end of the line 6 and moving in the direction F indicated in FIG. 1.

The substations $S_k$ are electrically connected to the grid 20.

Each substation $S_k$ is electrically connected to the line 6 at a connection point $P_k$. The point $P_k$ is separated from the point $P_{k+1}$ and the point $P_{k-1}$ by a distance D. This distance D is generally greater than several hundreds of meters, but in any case short enough for the substation $S_k$ to be able to power traction for a vehicle whereof the pantograph is situated at point $P_{k+1}$, whereas the substation $S_{k+1}$ is inactive. Here, the distance D is comprised between 1000 and 2000 m for a rated voltage $U_{C\text{-}nom}$ of 750 V DC and can reach up to 20 km for a rated voltage $U_{C\text{-}nom}$ of 3000 V DC.

Powering traction refers to the fact that the substation generates enough power on the line 6 to power the traction engines of the vehicles 46.

Each substation $S_k$ is associated with a traction power supply zone $Z_{tk}$ that is a segment of the line 6 centered around the point $P_k$. The half-length $T_k$ of this segment is defined by the following relationship:

$$T_k = (U_{ss\,max\,k} - U_{C\,min})/(\rho I_{max})$$

where:

$U_{ssmaxk}$ is the maximum traction operation voltage at the point $P_k$ that can be generated by the substation $S_k$, $U_{Cmin}$ is the minimum allowable voltage on the line 6, $\rho$ is the linear resistance of the line 6, and $I_{max}$ is the maximum allowable intensity of the current circulating on the line 6.

It should be noted that $U_{ssmaxk}$ is greater than or equal to $U_{Cnom}$. The distance D is chosen to be equal to or slightly smaller than the distance $T_k$ such that, irrespective of the position of the vehicle along the line 6, the latter is always simultaneously in both zones $Z_{tk}$ and $Z_{tk+1}$. Such a choice makes it possible to guarantee that the vehicles can be powered irrespective of their position along the line 6, even in case of breakdown of one of the substations $S_k$.

The substation $S_k$ is also associated with a zone $Z_{fk}$ for recovering the braking energy of the vehicle; it is a segment of the line 6 centered around the point $P_k$. The half-length of the segment $F_k$ is defined by the following relationship:

$$F_k = (U_{C\,max} - U_{C3\,min\,k})/(\rho I_{max})$$

where:

$U_{cmax}$ is the maximum allowable voltage on the line 6, and $U_{C3mink}$ is a lower bound for the value of a threshold $U_{C3k}$ that will be defined later.

Here, $U_{C3mink}$ is chosen to be less than or equal to $U_{Cnom}$. Thus, the distance $F_k$ is greater than or equal to the distance D.

For example, the bound $U_{C3mink}$ is chosen to be equal to 700 V DC for a system whereof the rated voltage $U_{C\text{-}nom}$ is equal to 750 V.

The zone $Z_{fk}$ is such that, irrespective of the position of the vehicle braking within that zone $Z_{fk}$, the substation $S_k$ can recover all or part of the braking energy of the vehicle.

Given that the distance $F_k$ is greater than or equal to the distance D, it is therefore possible to recover the braking energy of the vehicle either at the point $P_{k-1}$, or at the point $P_{k+1}$. Thus, even if the substation $S_k$ is out of service, the substations $S_{k-1}$ and $S_{k+1}$ can make it possible to recover the braking energy of the railway vehicle, irrespective of the position of the railway vehicle between the points $P_{k-1}$ and $P_{k+1}$. It is therefore possible to guarantee that all of the braking energy of the railway vehicle will be recovered, even if the substation is out of service.

The reversible substation $S_k$ includes a four-quadrant converter 30 connected on the one hand to the grid 20, and on the other hand to the point $P_k$ on the line 6.

This converter 30 is capable of rectifying the three-phase voltage of the grid 20 to deliver, on the line 6, a rectified DC voltage comprised between $U_{ssmaxk}$ and $U_{Cmin}$.

The converter 30 is also capable of inverting the DC voltage present on the line 6 to deliver, on the grid 20, a three-phase voltage built from that DC voltage comprised between $U_{C3mink}$ and $U_{Cmax}$. In inverter mode, the converter 30 makes it possible to absorb a DC current $I_k$ at most equal to a threshold $I_{kmax}$.

In the active state, the converter 30 is capable of switching from rectifier operation to inverter operation, and vice versa, in less than 10 ms to avoid braking losses at the vehicle.

To that end, the converter 30 is, for example, formed by a rectifier bridge connected in parallel to an inverter. Here, the rectifier bridge is a controlled rectifier bridge made from thyristors or power transistors such as IGBT (Insulated Gate Bipolar Transistor) transistors. The controlled rectifier bridge makes it possible to generate a fixed voltage of 750 V DC on the line 6, even in case of variations of more than 50% of the power consumed by the electric charge powered by means of the line 6.

The substation $S_k$ includes a programmable computer 29. The latter includes computation means 31, such as a processor, a clock (not shown), storage means 33, such as a random-access memory and a read-only memory, and an input/output interface (not shown) for connecting the computer to peripherals, such as the converter 30 or measurement sensors 34, 36. The processor is capable of executing the instructions of computer programs stored in the storage means 33.

The converter 30 is a controllable converter. To that end, the substation $S_k$ includes a control unit 32 capable of controlling the converter 30 to switch it from an inactive state to an active state, and vice versa, and, in the active state, to cause it to operate as a rectifier, and, alternatively, as an inverter.

When the converter is in the inactive state, the substation is said to be in standby mode; when the converter is in the active state and in rectifier operation, the substation is said to be in traction mode; and when the converter is in an active state and in inverter operation, the substation is said to be in braking mode. It should be noted that, in standby mode, the substation is powered on, but no vehicle is traveling on the track, i.e., the operating interval H, which will be defined later, is infinite.

More specifically, the unit 32 is capable of switching the substation into braking mode once the measured voltage $U_{ssk}$ is above a threshold $U_{C3k}$.

The unit 32 is also capable of switching the substation into traction mode once the voltage $U_{ssk}$ is below a threshold $U_{dk}$. For example, the threshold $U_{dk}$ is less than or equal to $U_{Cnom}$.

The unit 32 makes it possible to subjugate the voltage $U_{ssk}$ delivered or absorbed by the substation $S_k$ at the point $P_k$ to a set point $U_{ssc}$. To that end, the substation $S_k$ includes a sensor 34 for the intensity of the current $I_k$ and a sensor 36 for the voltage $U_{ssk}$ at the point $P_k$.

The substation $S_k$ also includes a module 40 for adjusting the value of the threshold $U_{C3k}$ as a function of the measured voltage $U_{ssk}$. The module 40 is for example of the type described in application EP 1,985,492 A1, its operation being described in that application.

The unit 32 and the module 40 are, for example, made in the form of computer programs whereof the instructions are stored in the storage means 33 of the computer.

Figure 2:
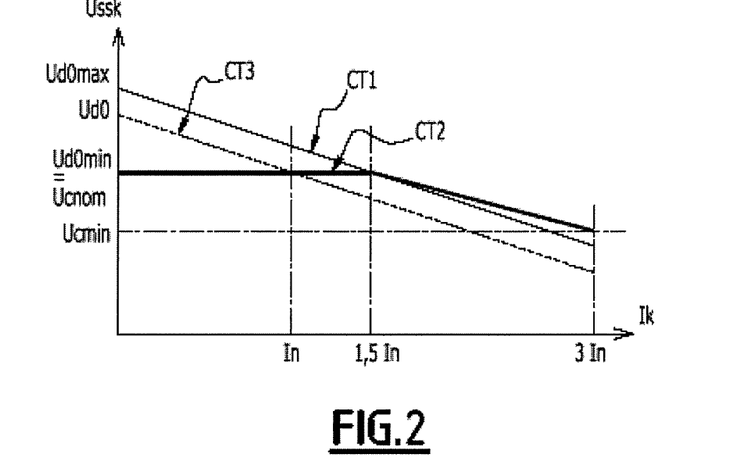
FIG. 2 is a graph showing different traction current/voltage characteristics for a reversible substation of FIG. 1.
Figure 3:
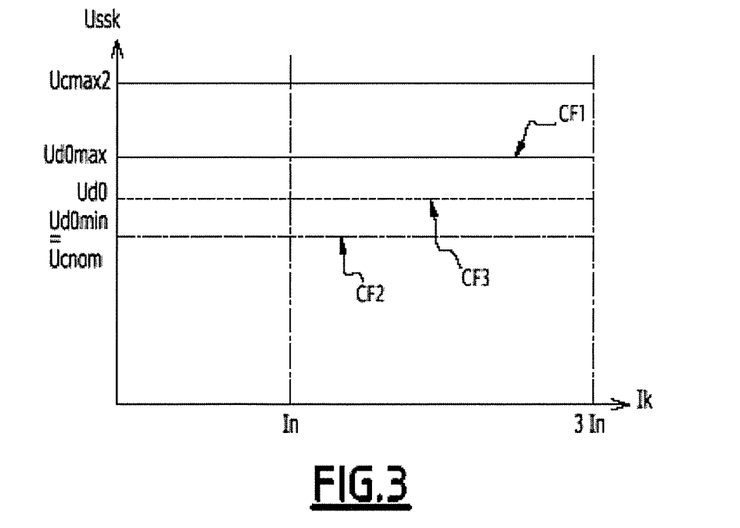
FIG. 3 is a graph showing different braking current/voltage characteristics for a reversible substation of FIG. 1.

At a given moment, the operating point of the converter 30 is, in traction operation, along a traction characteristic CT connecting the voltage $U_{ssk}$ to the current $I_k$ (like those shown in FIG. 2) and, in braking operation, along a braking characteristic CF connecting the voltage $U_{ssk}$ to the current $I_k$ (like those shown in FIG. 3).

The braking characteristic CF being a closed parametric curve with a complex shape (called NYQUIST curve), FIG. 3 only shows the excursion domain of the braking characteristics CF. This domain is limited, according to one of the voltages, by a characteristic interval. The broader that interval is, the larger the surface of the braking characteristic CF associated with it is, which corresponds, during recovery, to better efficiency of the braking energy.

At a given moment, the operation of the substation $S_k$ is determined by a pair of traction/braking characteristics CT/CF.

More generally, at a given moment t, the operation of the substation is determined by the current values Pc(t) of multiple configuration parameters that are used by the unit 32 to subjugate the converter 30.

A method making it possible to optimize the current values of the configuration parameters, and in particular the traction/braking characteristic pair used by the control unit 32, will now be described. The purpose of this optimization method is to automatically improve the energy efficiency of the substation based on its actual use in a particular system, as it is deployed and exploited.

The substation $S_k$ includes a module 50 for determining a favored operating mode.

The module 50 uses different operating parameters of the substation as input. In this illustrative embodiment, these operating parameters are the operating interval H, which is the inverse of the mean passage frequency of the vehicles at a point of the track, and the AC voltage Vn delivered by the grid 20.

The instantaneous values H(t) and Vn(t) of these operating parameters are stored in a first memory space 51 of the storage means 33.

The values of these parameters can be modified either by an operator or automatically, using an automatic train supervision (ATS) system of the grid. Thus, depending on the time of day, the current value of the operating interval H is modified to account, for example, for a peak time requiring an increase in the number and frequency of vehicles traveling along the track.

The current value of the AC voltage Vn results from the instantaneous measurement of the voltage actually delivered by the grid 20. Variations of ±10% around the nominal value of the AC voltage Vn are traditional and set out by standard EN 50160.

The module 50 delivers, as output, an instantaneous value M(t) of a "favored operating mode" variable. This variable assumes the value of +1 when the favored mode corresponds to the traction operation mode, the value −1 when the favored mode corresponds to the braking operation, and the value 0 when the integrated operating mode is "put away", i.e., no operating mode from among the traction operation and braking operation should be favored, and the value −2 when the favored mode corresponds to the standby mode of the substation.

If it is determined that the favored operating mode corresponds to the traction operation, the configuration parameters of the substation $S_k$ are optimized so as to allow better energy efficiency when the substation is actually in the traction operation mode, possibly to the detriment of the energy efficiency when the substation is in braking operation. In particular, the traction characteristic used by the control unit 32 is optimized so as to approach the curve CT1 in FIG. 2. The traction and braking characteristics being correlated to each other, when the traction characteristic used approaches the characteristic CT1, the corresponding braking characteristic approaches the braking characteristic CF1 of FIG. 3, which, due to its characteristic interval, has a reduced recovery efficiency.

If it is determined that the favored operating mode corresponds to the braking operating mode, the configuration parameters of the substation are optimized so as to allow better energy efficiency when the substation is actually in the braking operation mode, potentially to the detriment of the energy efficiency when the substation is in the traction operating mode. In particular, the braking characteristic used by the control unit 32 is optimized so as to approach the curve CF2 of FIG. 3. In parallel, the traction characteristic used approaches the curve CT2 of FIG. 2, which has a reduced energy efficiency in traction operation.

If it is determined that the favored operating mode is neutral, the configuration parameters of the substation $S_k$ are optimized so as to allow good energy efficiency both when the substation is in the traction operating mode and when it is in the braking operating mode. A mean adjustment of the traction and braking characteristics will be adopted. The value of the favored operating mode is "neutral".

Lastly, if it is determined that the favored operating mode is the standby mode, the configuration parameters with no traction load are optimized to improve the energy efficiency of the substation.

Figure 5:
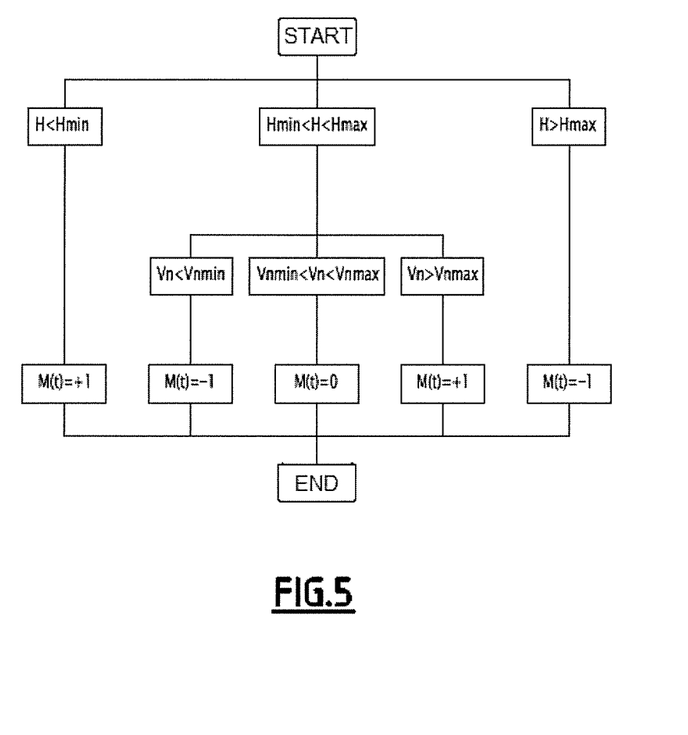
FIG. 5 is a block diagram of the algorithm for determining the instantaneous value of a favored operating mode.

To determine the instantaneous value M(t) of the favored operating mode, the module 50 implements an algorithm assuming the form of a decision tree that is shown in FIG. 5 and that will be described later, relative to the corresponding steps of the optimization method described hereinafter.

The substation $S_k$ includes a comparison module 54, capable of comparing the instantaneous value M(t) of the favored operating mode, delivered at the output of the module 50, and the current value Mc of that variable that is stored, at the considered moment, in the first memory space 51.

Only when the instantaneous value M(t) is different from the current value Mc does the module 54 record the instantaneous value in the first memory space 51 as current value of the favored operating mode.

The substation $S_k$ includes read/write means 56 capable of reading values of the configuration parameters associated with a particular value of the favored operating mode in the storage means 33, so as to write them in a second memory space 52 as current values Pc(t) of the configuration parameters. The unit 32 uses the current values Pc(t) to control the converters 30.

Conversely, the read/write means 56 are capable of reading the current values Pc(t) of the configuration parameters in the second memory space 52 to write them in the storage means 33 by associating them therein with a favored operating mode corresponding to the current value Mc of the favored operating mode.

The read/write means 56 also make it possible, upon a change of the value of the favored operating mode, to save the current values of the configuration parameters associated with the favored mode that is being left, and to load, as current values, the values of the configuration parameters associated, in the storage means 33, with the new favored mode.

The substation $S_k$ includes a computation module 62. This module is capable of computing, from instantaneous values of measured operating properties Gm(t), such as Uss, Ik, etc., and current values Pc(t) of configuration parameters of the substation, such as Uc3k, Ud, etc., instantaneous values Gc(t) of computed operating properties, such as:
the traction energy, Et;
the braking energy, Ef;
the power factor, Cos φ;
the harmonic distortion of the current, THDI;
the peak power, η; and
the mean power P0, on a base of 10 or 15 min., depending on the contractual reference of the energy providers.

The instantaneous values G(t) of the operating properties, measured and computed, are stored in a third predefined and shared memory space 53 of the storage means 33. They are stored therein with a time attribute indicating the measurement or computation moment.

The substation $S_k$ includes a mean value module 64, capable of computing the mean value Ĝ(t) of the last N instantaneous values G(t) of the operating properties. Preferably, N is chosen equal to 10.

The substation $S_k$ includes a module 72 for selecting an optimization function F. Such a function constitutes a quantitative criterion dependent on the operating properties characterizing the operating point of the substation and the maximization of which makes it possible to determine the best operating point of the substation.

An optimization function F is selected as a function of the current value of the favored operating mode, Mc, contained in the first memory space 51.

When the favored operating mode is equal to +1, the optimization function selected by the unit 72 is a traction optimization function.

When the favored operating mode is equal to −1, the optimization function selected by the unit 72 is a braking optimization function.

When the favored operating mode is equal to 0, the optimization function selected by the unit 72 is a neutral optimization function.

When the favored operating mode is equal to −2, the optimization function selected by the unit 72 is a standby optimization function.

An optimization function results from the weighted addition of multiple elementary optimization options, each elementary optimization function representing an elementary criterion pertaining to a particular operating property.

The traction optimization function FT for example includes the following elementary functions, which have been ordered based on the weight allocated to them in the traction optimization function, from the highest weight to the lowest weight:
  a first elementary function on the voltage Ussk, indicating that one wishes to increase the voltage;
  a second elementary function on the traction energy Et, indicating that one wishes to reduce that energy;
  a third elementary function on the harmonic distortion of the current THDI, indicating that one wishes to keep that distortion below a threshold, for example 5%;
  a fourth elementary function on the peak power η, indicating that one wishes to reduce the instantaneous power; and
  a fifth elementary function on the power factor cos φ, indicating the one wishes to keep that factor close to the unit.

The braking optimization function FF for example includes the following elementary functions, which have been ordered based on the weight allocated to them in the braking optimization function, from the highest weight to the lowest weight:
  a first elementary function on the braking energy, Ef, indicating that one wishes to increase that energy;
  a second elementary function on the harmonic distortion of the current THDI, indicating that one wishes to keep that distortion below a threshold, for example 5%;
  a third elementary function on the power factor cos φ, indicating the one wishes to keep that factor close to the unit; and
  a fourth elementary function on the efficiency η, indicating that one wishes to increase that efficiency.

The neutral optimization function, FN, for example includes the following elements or functions, which are assigned, in the neutral optimization function, a respective weight to be specified based on the application:
- support for the line voltage,
- overall net energy optimization (Et−Ef),
- Power factor, and
- Overall harmonic content.

Lastly, the optimization function in standby mode, FV, includes the following elementary functions:
- monitoring and regulation of the cooling accessories of the substation, in cost-saving mode,
- the deactivation of functions that are not necessary for the monitoring of security of the substation and peripheral equipment (load shedding).

The substation $S_k$ includes an evaluation module 74 capable of determining the value of the selected optimization function, from the values of the operating properties applied to it as input. The unit 74 thus evaluates the instantaneous value F(t) of the selected optimization function from the mean values $\hat{G}(t)$ of the operating properties. The unit 74 also evaluates the modified value ΔF(t) of the selected optimization function from the modified values ΔG(t) of the operating properties. The manner in which these modified values are obtained is described hereinafter.

The substation $S_k$ includes a variation module 76 designed to compute the modified values ΔG(t) of the operating properties from the mean values $\hat{G}(t)$ of the operating properties that are applied to it as input. The modified values are computed to remain "close" to the mean input values. The unit 76 uses a distance criterion in the space of the n-uplets whereof the components correspond to the operating properties. For example, the unit 76 determines the modified values ΔG(t) by a random drawing in a hyper volume around the mean values $\hat{G}(t)$ of the operating properties.

The substation $S_k$ includes a maximization module 78 capable of selecting, as maximized values $G_{max}(t)$ of the operating properties, the modified values ΔG(t) that lead to a value of the optimization function F greater than the instantaneous value of that function F(t).

The substation $S_k$ includes an inverse computation module 80 capable of determining, from the maximized values $G_{max}(t)$ of the operating properties, optimized values Po(t) of the configuration parameters. The unit 80 is capable of writing these optimized values in the second memory space 52 as current values Pc(t) of the configuration parameters.

The substation $S_k$ also includes, to manage an integer counter T representing the iterations of the method described above, means for initializing that integer at a value of zero, to increment it by one unit and to compare them to a reference value T0, for example equal to 10.

Figure 4:
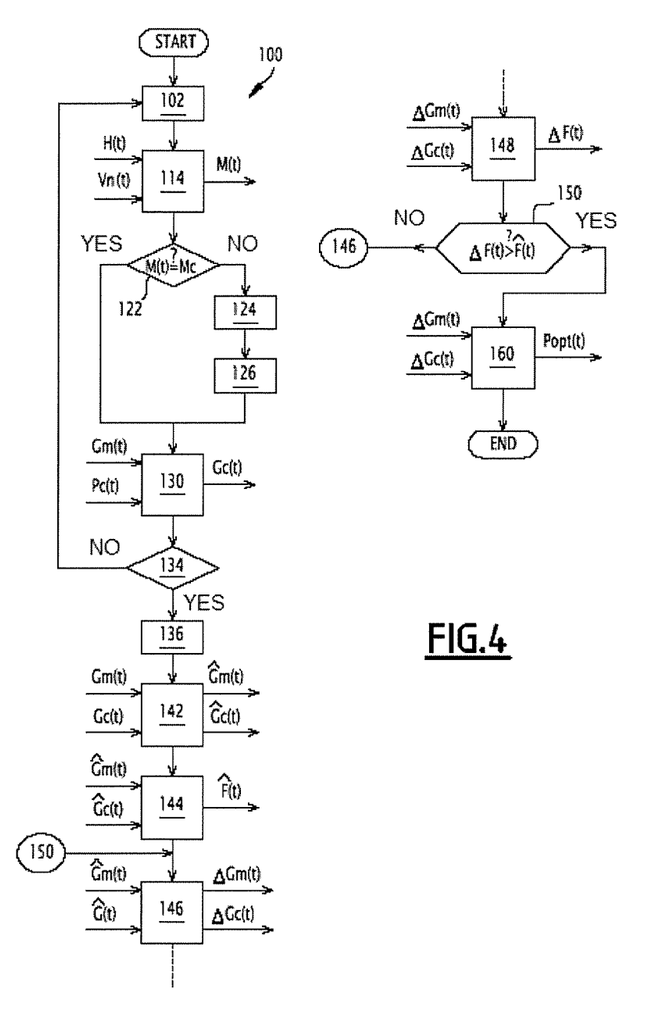
FIG. 4 is a block diagram of the method for optimizing the configuration parameters implemented by a substation of the system of FIG. 1.

The method for optimizing the operation of the substation $S_k$ will now be described in detail in reference to FIGS. 4 and 5.

The method 100 is executed periodically, for example every minute.

Upon each execution, a counter T is incremented by one unit (incrementing step 102).

The execution of the method 100 begins with a step for determining the current value Mc of the favored operating mode.

During a decision step 114, the module 50 is called upon. It reads, in the first memory space 51, the instantaneous value of the operating interval H and that of the AC voltage Vn. Then, the module 50 implements a decision algorithm as illustrated in FIG. 5:
- If the operating interval H is below a first lower threshold Hmin, for example 3 mn, the favored mode assumes the value +1, which corresponds to traction operation. This is the case when traffic on the track is heavy (high receptivity of the line), i.e., at peak times for operating of the track. A decision is then made to favor the quality of the power supply for the traveling vehicles.
- If the operating interval H is above a first upper threshold Hmax, for example 1 h, the favored mode assumes the value −1, which corresponds to braking operation. This is the case where the braking energy generated on the line can only be returned to the grid 20, since it is fairly unlikely that another train traveling on the track will be able to recover that energy (low receptivity of the line).
- If the operating interval H is above the first lower threshold Hmin and below the first upper threshold Hmax, the module 50 takes the current value of the AC voltage of the grid 20 into account.
- If the AC voltage Vn is below a second lower threshold Vnmin, for example 1000 V, the favored mode assumes the value −1, which corresponds to braking operation. This corresponds to low-traffic times of a system for an urban transport-type grid, where the receptivity of the line is low and the regeneration of the braking energy by the substation must be favored.
- If the AC voltage Vn is above an upper threshold Vnmax, for example 1500 V, the favored mode assumes the value +1, which corresponds to traction operation. This corresponds to a system for a main line-type grid, where the regeneration of the braking energy of the trains is secondary and the traction energy function must be favored.
- Lastly, if the AC voltage Vn is above the second lower threshold Vnmin and below the second upper threshold Vnmax, the favored mode assumes the value 0, which corresponds to the neutral mode where none of the traction or braking operating modes are favored. This corresponds to a system for a suburban-type grid based on electric cars or trains pulled by locomotives, where the operator must be allowed to choose the assigned constraints based on the power supply characteristics of the lines.

The value delivered by the module 50 delivers is the instantaneous value M(t) of the favored operating mode.

The determination of the favored operating mode continues by updating the current value Mc from the instantaneous value M(t). If the instantaneous value M(t) is different from the current value Mc does the module 54 record the instantaneous value in the first memory space 51 as new current value of the favored operating mode. This is done, during a comparison step 122, by comparing the current value Mc of the favored operating mode, stored in the first memory space 51, with the first instantaneous value M(t).

If the instantaneous value of the favored operating mode is different from its current value, the following steps take place:
- during a step 124, the read/write means 56 save the current values P(t) of the configuration parameters present in the second memory space 52, in the storage means while associating them with the current value Mc of the favored operating mode, then read, in the storage means, the values of the configuration parameters that are associated with the instantaneous value M(t) of the favored operating mode, to place them in the second memory space 52, as current values P(t) of the configuration parameters. From that moment, the control unit 32 accesses the values of the configuration parameters that are stored in the second memory space, and in particular uses a traction/braking characteristic pair associated with the current value M(t) of the favored mode; then, the module 56 records the instantaneous value M(t) of the favored mode as the current value Mc in the first memory space 51.

during a step 126, the selection module 72 selects, in the storage means, the optimization function F corresponding to the new current value Mc of the favored mode and loads it in the evaluation module 74.

After these steps, or if the current value of the favored operating mode is unchanged, the method carries out a computation step 130. During that step, the computation module 62 is called on to compute the instantaneous values Gc(t) of the computed operating properties, from the current values P(t) of the configuration parameters and the instantaneous values Gm(t) of the operating properties measured by the different sensors.

The instantaneous values G(t) of the operating properties, measured and computed, are stored in a third memory space 53 of the storage means, with a time attribute, corresponding to the current value of the counter T.

During a comparison step 134, the current value of T is compared to a reference integer T0, for example equal to 10.

If T is below 10, the method resumes with step 102.

If T is equal to 10, after resetting the counter T to zero (step 136), the method continues with the optimization phase of the configuration parameters.

During a computation step 142, the module 64 is called upon to compute the mean value Ĝ(t) of the operating properties, from the last ten instantaneous values G(t) of the operating properties contained in the third memory space 53.

During an evaluation step 144, the evaluation module 74 is executed to compute the instantaneous value F(t) of the optimization function F selected by the module 72. This computation uses the mean values Ĝ(t) of the operating properties.

During a variation step 146, the variation module 76 is executed so as to determine modified values ΔG(t) of the operating properties from the mean values Ĝ(t) of the operating properties.

During a computation step 148, the module 74 is once again executed to compute the modified value ΔF(t) of the selected optimization function. This computation now uses the modified values ΔG(t) of the operating properties.

During a maximization step 150, the modified value ΔF(t) of the optimization function is compared to its instantaneous value F(t) using the maximization module 78.

If the modified value ΔF(t) is below the instantaneous value F(t), the method returns to step 146 so as to determine another set of modified values ΔG(t) of the operating properties.

If the modified value ΔF(t) is above the instantaneous value F(t) of the constraint function, the method goes on to an inverse computation step 160.

During this computation 160, the inverse computation module 80 is called upon in order, from the modified values ΔG(t) of the operating properties that maximize the optimization function F, to determine the optimized values Popt(t) of the configuration parameters.

The values of the configuration parameters thus optimized are stored in the second memory space 52 as current values P(t) of the configuration parameters. In particular, the control unit 32 uses the updated values of the configuration parameters to control the converter 30.

At the end of this computation 160, the method ends.

According to the method defined above, the substation Sk dynamically determines the favored operating mode at the current moment and optimizes the configuration parameters associated with that operating mode.

In the described embodiment, the determination of the favored operating mode is done from the operating parameters H and Vn.

Alternatively, in place of the AC voltage Vn, the distance operating parameter D between two consecutive substations is used in the decision tree as follows:

If the operating interval H is above the first lower threshold Hmin and below the first upper threshold Hmax, the module 50 takes the current value of the distance D between two adjacent substations.

If the distance D is below a second lower threshold Dmin, for example 2000 m, the favored mode assumes the value −1, which corresponds to braking operation.

If the distance D is above an upper threshold Dmax, for example 10,000 m, the favored mode assumes the value +1, which corresponds to traction operation.

Lastly, if the distance D is above the second lower threshold Dmin and below the second upper threshold Dmax, the favored mode assumes the value 0, which corresponds to the neutral mode where none of the traction or braking operating modes are favored.

According to another alternative, the determination of the favored operating mode takes the current values of the configuration parameters of the substations adjacent to the considered substation Sk into account, and in particular the current values of their respective favored operating modes, for overall synchronization of the grid.

The optimization of the configuration parameters of the operating mode corresponding to the favored mode is done by learning, from the history of the actual use of the substation once the system has been deployed and exploited.

In the illustrative embodiment, a depth of 10 or 15 mn, corresponding to the measurement window used by the power suppliers, is used, but other ways of accounting for the history of the operation of the substation can be considered.

The optimization uses a constraint function.

In the described embodiment, the weights assigning the different elementary functions of the optimization function are fixed. The number and nature of the elementary functions used are also fixed.

Alternatively, these weights result from the implementation of an estimating algorithm, for example of the neuron network type.

Alternatively, the elementary functions introduced into the optimization function result from an adaptation algorithm, for example of the genetic algorithm type.

For the optimization strictly speaking, the illustrative embodiment provides for a random drawing in the vicinity of the current values of the operating properties.

Alternatively, the operating properties are modified based on a computation of the variations of the constraint function.

The invention claimed is:

1. A method for optimizing the operation of a reversible substation of a power supply system for railway vehicles, the system being situated at the interface between a power supply grid and a DC power line, said DC power line being positioned along a track and being electrically connected to a railway vehicle, said reversible substation having a traction operating mode in which the reversible substation transfers electricity delivered by the power supply grid to the DC power line, a braking operating mode in which the reversible substation transfers excess recovery electricity captured on the DC power line to the power supply grid, the method comprising:

determining a current value of a first operating mode selected from the traction operating mode and the braking operating mode based on instantaneous values of a plurality of operating parameters of the substation;

selecting an optimization function from a plurality of optimization functions based on the current value of the first operating mode, the optimization function depending on at least one operating property of the group comprising: voltage, traction energy, harmonic distortion of current, peak power, power factor, braking energy, efficiency, overall net energy and overall harmonic content;

maximizing the selected optimization function to obtain a maximized value for each operating property of the plurality of operating properties;

computing an optimized value for each configuration parameter of a plurality of configuration parameters of the substation based on the maximized values of the plurality of operating properties; and setting the instantaneous values of the plurality of configuration parameters of the substation at said optimized values of the plurality of configuration parameters.

2. The method according to claim 1, wherein the current value of the first operating mode includes the value +1 when the selected mode is the traction operating mode, the value −1 when the selected mode is the braking operating mode, optionally the value 0 when no operating mode is selected, and optionally the value −2 when the selected mode is a standby mode, in which no energy is exchanged between the power supply grid and the DC power line and the substation is controlled to minimize its electricity consumption.

3. The method according to claim 2, wherein the determination of the current value of the first operating mode comprises a decision step that implements an algorithm of the decision tree type to determine an instantaneous value of the first operating mode based on the instantaneous values of the plurality of operating parameters of the substation and an update step that updates the current value with the instantaneous value.

4. The method according to claim 3, wherein said algorithm of the decision tree type takes, as input, the instantaneous values of the plurality of operating parameters comprising an operating time interval of the railway vehicles along the track, an AC voltage delivered by the power supply grid, and, when the system includes at least two reversible substations, a distance between said at least two reversible substations.

5. The method according to claim 1, including a selection step for selecting the optimization function to be maximized, based on the current value of the first operating mode.

6. The method according to claim 5, wherein the optimization function is a weighted sum of multiple elementary functions.

7. The method according to claim 6, wherein the selection step uses an algorithm for estimating weights used in the weighted sum of multiple elementary functions.

8. The method according to claim 6, wherein the selection step uses an adaptation algorithm causing an evolution of the elementary functions in the weighted sum of multiple elementary functions.

9. The method according to claim 1, wherein the maximizing step includes determining the instantaneous value of the selected optimization function as a function of the values of the operating properties, the modification of the instantaneous values of the operating properties, the determination of the modified value of the optimization function as a function of the modified values of the operating properties, the comparison of the modified value and the instantaneous value of the constraint function, and, when the modified value is greater than the instantaneous value, allocating the modified values as maximized values of the operating properties.

* * * * *